Oct. 3, 1933.  B. C. WETTERSTAD  1,928,772
HOISTING APPARATUS
Filed Aug. 12, 1931   2 Sheets-Sheet 1

INVENTOR
BUORNE C. WETTERSTAD
BY
ATTORNEY

Oct. 3, 1933.　　B. C. WETTERSTAD　　1,928,772

HOISTING APPARATUS

Filed Aug. 12, 1931　　2 Sheets-Sheet 2

INVENTOR
BJORNE C. WETTERSTAD
BY
ATTORNEY

Patented Oct. 3, 1933

1,928,772

UNITED STATES PATENT OFFICE 1,928,772

HOISTING APPARATUS

Bjorne C. Wetterstad, Evanston, Ill., assignor to Fairbanks, Morse & Co., Chicago, Ill., a corporation of Illinois Application August 12, 1931. Serial No. 556,517

16 Claims. (Cl. 214—125)

This invention relates to improvements in hoisting apparatus, and more particularly to automatic loading devices employed in connection with material-handling stations, and the like, and particularly adapted for use in installations employing a relatively shallow loading pit.

An object of the present invention is to provide an improved material-handling station, which includes a material-receiving bin or hopper, and a skip hoist or bucket, the loading station being so arranged that the depth of the loading pit below the ground level is greatly reduced from that which is usually necessary for installations of this type.

A further object is to provide an improved skip hoisting apparatus for handling materials, which includes a material receiving bin having a discharge opening associated with a movable closure gate, and means associated with the gate for automatically delivering a predetermined quantity of material to the skip, and thereby preventing overloading of the skip.

An additional object is to provide an improved shallow pit loading apparatus for material handling stations, which comprises a material-receiving hopper having a delivery opening, a movable gate and transfer member associated with the opening, and means carried by the gate and actuated by a skip hoist for positively moving the gate and transfer member between open and closed positions relative to the delivery opening.

Figure 1:
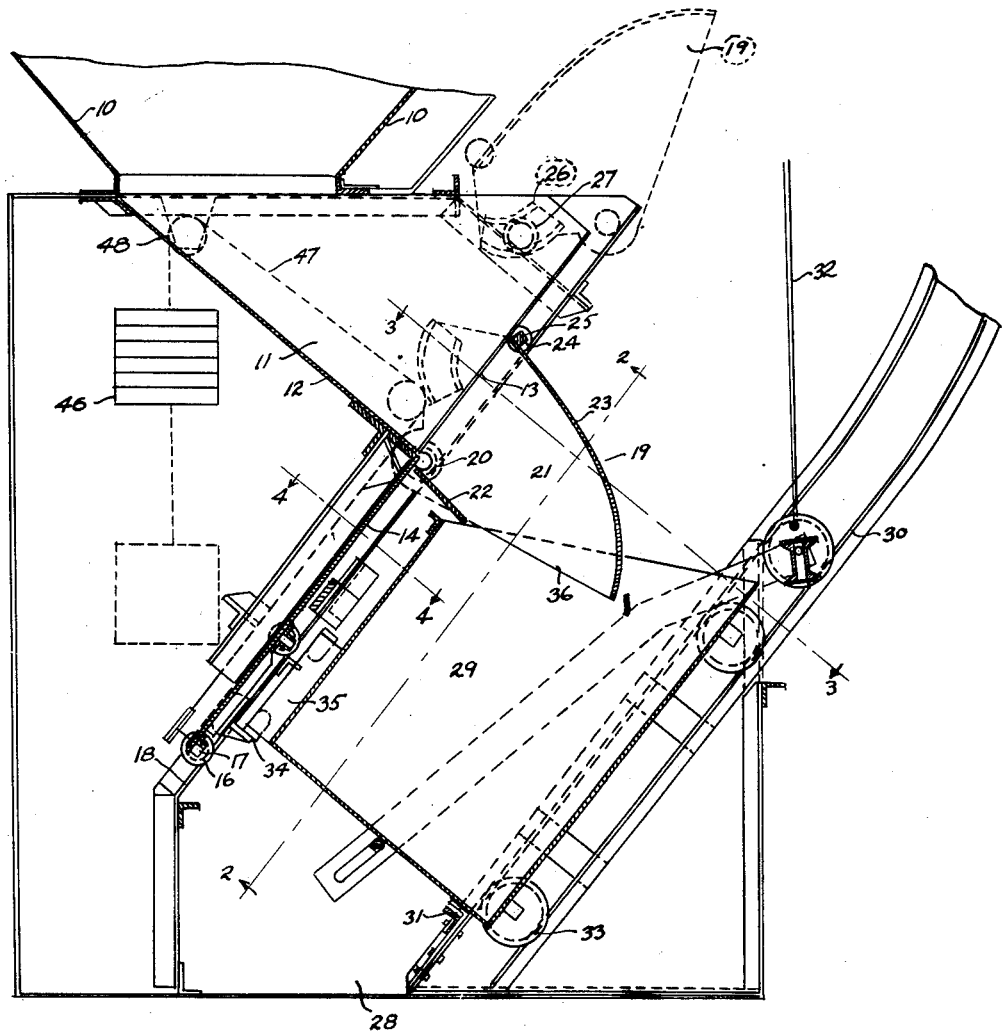
Figure 2:
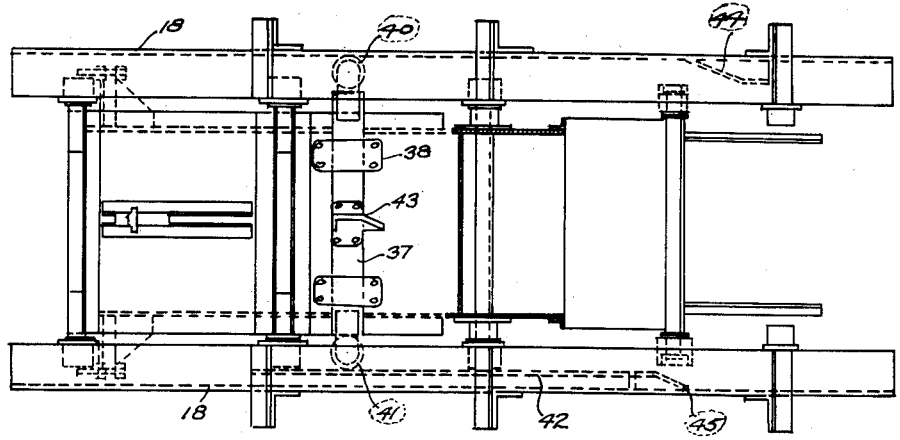
Figure 3:
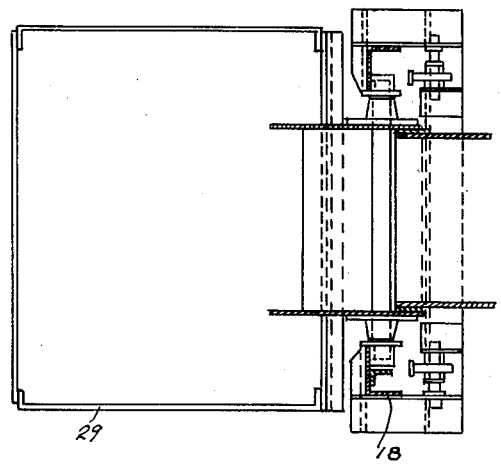
Figure 4:
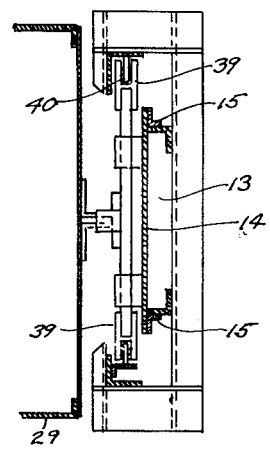

Further objects and advantages will appear from the following detailed description of parts and the accompanying drawings, in which:

Fig. 1 is a longitudinal sectional elevation of a preferred form of shallow pit loading apparatus, to which certain of the present improvements are applied; Fig. 2 is a plan view of certain portions of the apparatus as viewed from the line 2—2 in Fig. 1, the skip being away from loading position; Fig. 3 is a section taken along line 3—3 in Fig. 1, and Fig. 4 is a section taken along the line 4—4 in Fig. 1.

Referring by numerals to the drawings, a material receiving bin or hopper is designated, generally, at 10, and is disposed, either above or below the ground level according to the purpose of its intended use. In the preferred example, the hopper 10 is disposed below the ground level and immediately below the usual railroad tracks (not shown) so that the material-loaded cars upon the tracks, may dump directly into the hopper. The storage hopper 10 is, by preference, provided with a discharge chute 11, which is provided with a bottom floor portion 12, which is, by preference, inclined at an angle with respect to the horizontal. The inclination of this floor is determined according to the angle of repose of the material to be handled. This chute is provided with an open end 13, through which the material may be discharged. It will be readily seen that the chute 11 is supported by a suitable frame structure depending from the hopper. The discharge of material from the chute is controlled by a plane or flat closure gate 14, which is movably mounted, as an undercut closure, for this purpose as will hereinafter appear. The gate 14 may be formed of a sheet plate, of steel or any other suitable material. This gate is, by preference, provided with angle members 15 (Fig. 4) which are securely attached in spaced parallel relation on the gate, so as snugly to engage opposite sides of the chute 11, and thereby to guide the gate positively in its sliding movements, and also to provide a positive closing seal to prevent material from creeping out of the chute, when the gate is in closed position.

The under side of the gate 14 is, by preference, provided with a plurality of rollers or wheels 16 which are suitably journaled on stub shafts or axles 17 fixedly secured to the gate. These rollers, on opposite sides of the gate, serve to support the gate in rolling relation on guide angles 18 which are supported in turn by the frame structure of the chute. These guide members serve to support and determine the path of travel of the discharge gate, in its opening and closing movements, as will more clearly appear in Fig. 1. A hood or chute extension structure 19 serves to direct the material, when the discharge gate is open, from the chute to its desired hoisting receptacle. This chute extension is pivotally secured to a through shaft 20, which is secured to the upper end of the gate, in such a manner that the gate and hood are pivotally related. The hood member 19 is, by preference, provided with side portions 21, a bottom or apron portion 22, and an arcuate imperforate top portion 23, thereby forming a conduit, which is so constructed, as to direct the material passing therethrough, directly into a receiving hoist for a purpose hereinafter appearing. A plurality of rollers 24 are, by preference, mounted on stub shafts 25, which are secured to the top portion 23 of the hood member (Fig. 1). These rollers serve, when the gate is in opening position, to engage the guide angles 18 to support and guide the hood member in its lowering and lowered positions. There are, by preference, provided a plurality of cam or channel members 26 which are fixedly secured, exteriorly of the hood, to the opposite side portions 21 thereof, these cams serving, at times, to cooperate with rollers 27 (Fig. 1) mounted on suitable stub shafts fixedly secured to the frame structure supporting the chute. The purpose of these cams and rollers will more clearly hereinafter appear.

Below the discharge chute 11, there is provided a loading space 28 or pit of a depth below the ground level to accommodate conveniently a skip bucket 29 in its lowered position (Fig. 1). This skip is arranged to travel between a pair of spaced tracks 30, which comprise suitable guideways disposed below the skip, and so positioned relative to the discharge chute, that the skip is aligned in its downward travel with respect to the discharge opening 13, and that at or near its lowest limit of travel as determined by a stop 31, the upper or open side of the skip is brought substantially in adjacence to the delivery opening 13. The skip is provided, by preference, with a usual bail, which may be swingably associated with the skip, and with which is associated a hoisting cable 32. It will be readily seen that the path of travel of the skip is determined definitely by a plurality of skip wheels 33 which are flanged to ride on or between the tracks 30. In the preferred example, these tracks may form part of a hoisting tower, or the like, to direct the material in the skip, to storage bins or other desired places of deposit.

On the underside of the gate 14 there is provided an improved gate opening and closing device. The gate opening device preferably comprises a lug 34 which is fixedly secured near the innermost end of the gate. This lug is, by preference, disposed centrally of the gate and projects into the path of travel of the skip or bucket for a purpose soon appearing. Near the innermost end portion of the skip and facing the chute, there is provided a projecting block member 35, which is fixedly secured to the skip. This member is, by preference, centrally disposed transversely of the bucket, and in alignment with the lug 34 of the gate, so that the bucket and the projection 35 in its travel downwardly (as shown in full lines in Fig. 1), will engage the lug 34 on the gate, and urge the gate to open position, thereby permitting material to be fed to the skip. It will readily be seen that the skip in this movement carries with it the gate 14, as well as the chute extension structure 19, which through its cam surfaces 26 cooperating with the rollers 27, cause the hood to be moved pivotally about the shaft 20 until the rollers 24, carried by the hood, engage the guide rails 18. When this occurs, the discharge end of the hood structure is in a position entirely within the open side of the bucket to feed material from the chute 11 to the skip bucket 29. By this provision the movement of the gate and hood structure are positively controlled. It will further be readily readily seen that the arcuate top portion 23 of the chute extension directs the flow of material directly into the interior and towards the bottom of the skip, and that the apron portion 22 bridges the gap between the skip bucket and the discharge opening 13, thereby to insure that all material be delivered uniformly over the interior of the skip. The closed hood structure is arranged to determine the quantity of material delivered to the skip, for it will be seen that when the material in the skip attains the level of an open end 36 of the chute extension, the flow of material to the skip stops, and overloading of the skip is prevented. After the skip is loaded it is ready for movement away from the material delivery chute, and it is during this movement that the improved gate and hood closing device comes into action.

A bar member 37 (Fig. 2) is arranged transversely of the gate, and is slidably disposed for endwise movement in bearing straps 38, which are fixedly attached to the underside of the gate 14. This bar member is, by preference, disposed inwardly of, and spaced from the lug 34 approximately a distance measured by the length of the abutting member 35, carried by the skip for a purpose hereinafter appearing. The end portions of the bar member 37 are, by preference, provided with forked or bifurcated portions 39 (Fig. 4), between the furcations of which are disposed rollers 40 and 41. In certain movements of the gate the roller 40 engages the guide angle 18, while the roller 41 engages a guide angle 42, which is in turn supported by, and extended inwardly from the opposite angle 18. A depending angle member 43 is carried by the bar 37, so as to project toward the path of movement of the skip. It will be readily seen that the bar 37 including the attached rollers 40 and 41, is, by preference, shorter in length than the transverse span of the guide rails 18, and that the angle member 42 is spaced from the guide 18 so that the rollers 40 and 41, engage, respectively, the guide 18 and the member 42 (Fig. 2) in certain positions of the skip. When the bar 37 is in the position of Fig. 2, the member 43 on the bar is in alignment with the abutting member 35 carried on the skip, and also aligned with the lug 34 on the gate. It will readily be seen that, with the skip in its lowest or loading position, the member 35 on the skip is in lateral engagement with one end of the member 34 on the gate, and on its opposite side with the member 43 carried by the bar 37. From this position, after the skip has been loaded, the skip is drawn upwardly along the tracks, and the member 35 abuts against the member 43 carried by the gate, and moves the gate positively towards closing position, the rollers 40 and 41 following, respectively, the guide rails 18 and 42. After the gate 14 has been brought substantially to closed position, the roller 40 engages an inclined block 44 (Fig. 2) fixedly secured to rail 18, the inclined block serving to displace, endwise, the bar 37, and with it automatically slides member 43 away from abutting member 35 on the bucket, thus releasing the driving connection, and closing movement of the gate stops. It will be readily seen that as the roller 40 engages the block 44, the roller 41 also engages an inclined block 45 which is fixedly secured to the rail 18, and which is inclined toward and merges with the guide rail 18.

It will be readily seen that during the above described movement of the bucket and actuation of the gate to its closed position, the chute extension is also moved upwardly, being guided in its travel by the rollers 24 riding in the guide rails 18. This movement continues until the cam members 26 on the hood structure engage the rollers 27, then subsequent movement of these members causes the hood to pivot about its shaft 20 to the position shown in dotted lines in Fig. 1. This pivotal movement stops at the time the gate is completely closed and the chute extension is in non-loading position, free from the path of travel of the bucket. It will be seen that the channeled members 26 are, by preference, formed as an arcuate guideway, and that when the roller 27 is positioned in the guides, as shown in dotted lines in Fig. 1, they cooperate to hold the chute extension in non-loading position. A counterweight 46 suspended on a cable 47 which rides over sheaves 48, urges the gate to closed position and tends to balance and hold the gate in this position.

In the recurring operation of the skip, as it moves downwardly into the pit, to its point of loading, the member 35 is caused to pass or clear the member 43 on the bar 37, due to the fact that during the previous upward travel of the skip, the bar was so positioned through the cooperation of the rollers 40 and 41 and the guides 18 and 42. However, on further downward movement of the skip, as the member 35 is brought beyond the member 43 the member 35 is positioned to engage the member 34 on the gate. The engagement of these members effected near the lower limit of movement of the skip, causes the gate to be opened, downwardly, by the weight of the skip or bucket. Obviously, as the gate is opened, the bar 37 is moved with it and the roller 41 is brought into engagement with the camming surface of block 45, with the result that the bar 37 is displaced endwise to an extent sufficient to align the member 43 with the member 35. The result is that these parts are in position to engage when the loading skip is again moved upwardly, at which time the member 35 is disposed between the two members 43 and 34 carried by the gate. It will clearly appear that when the parts 34, 35 and 43 are thus relatively positioned, and the skip moves upwardly, the gate is lifted to closed position.

The improved self-loading device herein described is simple and effective in operation, in that the various members are all coordinated to function automatically and positively, and without any danger of overloading the skip bucket. It will be readily seen that the member 35 on the bucket is the only element which must be added to the usual standard skip bucket, thereby eliminating any undesirable expensive mechanism being placed on each skip. With this exception, all of the opening and closing apparatus is carried by the gate, and comprises only a few parts of simple construction which are not apt to be injured or rendered inoperative. Further it will be seen that the loading apparatus is such as to provide for direct communication between the chute and the skip, so that waste due to spillage or improper loading, is entirely eliminated. It will appear that, according to the present construction, the apron member 22 of the chute extension is at no time in contact with the lip or edge of the bucket, and there are thus obviated all destructive impacts which might otherwise cause injury to the apron.

It will, of course, be understood that the present detailed description of parts and the accompanying drawings relate to a single preferred executional embodiment of the invention, and that substantial changes may be made in the described arrangement and construction of parts without departing from the spirit and full intended scope of the invention.

I claim as my invention:

1. In a skip hoist, in combination, a delivery chute, a skip adapted to be loaded therefrom, a sliding closure member for said chute, a chute extension carried by and movably connected to said closure member, said chute extension having a wall portion adapted, when said chute closure is open, to stop the flow of material to said skip.

2. The combination in a skip hoist, of a skip, means for raising and lowering the skip, a material delivery chute, a closure member for said chute, a chute extension pivotally secured to said closure member, said extension having a closed top portion adapted to direct the material into said skip, when in loading position.

3. In a self-loading apparatus for material handling, a material delivery chute, a skip adapted to be lowered in adjacent to said chute, a closure gate for said chute, a chute extension swingably connected to said gate, means carried by said skip for moving said gate and chute extension to loading position, and a closure element carried adjacent the outer end of said chute extension for determining the limit of self-loading.

4. The combination in a material-handling device, of a delivery chute, a closure gate for said chute, a chute extension pivotally carried by said gate, a guide member associated with said chute extension, and means cooperating with said guide for determining the pivotal movement of said chute extension.

5. In a skip hoist, in combination, a chute and a skip adapted to be loaded therefrom, a closure member for said chute, a chute extension pivotally connected to said closure member, means on said skip for actuating said closure member and chute extension to loading position, and directing means carried by said extension and chute, adapted for directing movement of said extension to feeding position, with respect to said skip.

6. In a skip hoist, in combination, a chute and a skip adapted to be loaded therefrom, a closure member for said chute, a chute extension hingedly related to said closure member, and adapted to be pivotally moved between loading and non-loading positions, means associated with the skip for actuating said gate and chute extension between loading and non-loading positions, and means for guiding said chute extension into either position.

7. In combination in material handling apparatus, a chute, a closure gate for said chute, a chute extension movable relative to said gate, guide members carried by said chute, said gate and chute extension being adapted to be moved selectively to loading and non-loading positions, and guide followers carried by the gate and extension, and cooperating with said guide members, for directing said gate and chute extension to either loading or non-loading position, and for maintaining said chute extension in non-loading position.

8. In combination in a material handling device, a chute, a closure gate for said chute, guideways along the path of movement of said gate, a chute extension adapted to be swung into loading position, and guide elements on said chute extension, cooperating with said guideways for maintaining said chute extension in loading position.

9. In a skip hoist, in combination, a chute, a skip adapted to be loaded therefrom, a closure gate for said chute, gate-guiding tracks disposed laterally of said gate, a hood member movably associated with said gate, means on the skip for actuating said gate and hood selectively between loading and non-loading positions, hood guiding flanges carried laterally of said hood member, stationary flange-engaging elements coacting with the flanges responsively to skip movement, to effect a limited pivoted movement of said hood, and elements on the gate and hood, cooperating with said gate tracks, for directing said gate and hood to skip-loading position.

10. In a skip hoist, in combination, a chute and a skip adapted to be loaded therefrom, a closure gate for said chute, a chute extension pivotally carried by said gate, and a member associated with said skip for moving said chute extension and gate between loading and non-loading positions.

11. In a skip hoist, in combination, a chute, a closure gate for said chute, a skip adapted to be raised from and lowered into position adjacent said chute, means associated with the skip for moving said gate to open position, a member displaceably carried by the gate, and cooperating with said gate-moving means, for moving said gate to closed position, and means for shifting said member out of engagement with said gate-moving means, when said gate substantially attains its closed position.

12. In a material handling apparatus, a movable hoisting member for receiving material to be handled, a hoistway for said member, a loading station adjacent said hoistway including a loading-closure member, an element movably carried by one of said members and adapted selectively to associate said members in operative and inoperative relation according to the position of said members relative to each other, and means in said hoistway, operable upon movement of said hoisting member, to effect movements of said element.

13. In a skip hoist assembly, a loading bin, a chute, a skip movable to and from a loading position adjacent said chute, a hoistway for said skip, a sliding gate for said chute and means for operating said gate responsively to predetermined movements of said skip, said means including a bar member carried by and mounted for endwise movement transversely of said gate, a member on said skip adapted to engage said bar member, and camming means disposed in said hoistway for shifting said bar member as the skip is moved through portions of its path of travel.

14. In a self-loading material handling apparatus, a loading hopper, a discharge chute directed therefrom, a hoist receptacle, a hoistway therefor, a sliding gate for said chute, an abutment member mounted for shifting movement laterally of said hoistway, and arranged for selectively operatively connecting said receptacle and said gate, and an abutment-shifting device located along said hoistway, and operable upon movement of said receptacle for selectively positioning said member.

15. In combination, in material elevating apparatus, a hoisting skip, a hoistway therefor, a chute arranged for feeding material to said skip, a gate for said chute, a member disposed for movement across said hoistway between said skip and said gate, and a camming device adjacent the path of said skip, and operable upon predetermined movements of the skip in said hoistway, to move said member into operatively connecting relation with said skip and gate.

16. In a skip hoist assembly, a skip, a hoistway therefor, a material loading chute directed to said hoistway, a gate slidably disposed in said hoistway at the discharge end of said chute, and arranged for actuation between open and closed positions by said skip, a latching bar carried by said gate and extending into said hoistway, projections on said skip and latching bar, certain of said projections being adapted for movement, selectively, into engaging and non-engaging relation, means constituting a stationary camming surface disposed in said hoistway adjacent said gate and latching bar, and adapted upon movement of said skip to and from its loading position, to effect an endwise movement of said latching bar.

BJORNE C. WETTERSTAD.